(12) United States Patent
Savela

(10) Patent No.: US 10,240,529 B2
(45) Date of Patent: Mar. 26, 2019

(54) GAS TURBINE ENGINE AFT BEARING ARRANGEMENT

(71) Applicant: United Technologies Corporation, Farmington, CT (US)

(72) Inventor: Gregory M. Savela, Stuart, FL (US)

(73) Assignee: United Technologies Corporation, Farmington, CT (US)

( * ) Notice: Subject to any disclaimer, the term of this patent is extended or adjusted under 35 U.S.C. 154(b) by 252 days.

(21) Appl. No.: 15/274,465

(22) Filed: Sep. 23, 2016

(65) Prior Publication Data

US 2017/0009655 A1    Jan. 12, 2017

Related U.S. Application Data

(60) Continuation of application No. 14/033,652, filed on Sep. 23, 2013, now Pat. No. 9,476,320, which is a
(Continued)

(51) Int. Cl.
*F01D 25/16* (2006.01)
*F02C 7/06* (2006.01)
(Continued)

(52) U.S. Cl.
CPC .............. *F02C 7/06* (2013.01); *F01D 25/162* (2013.01); *F01D 25/164* (2013.01); *F02C 3/10* (2013.01); *F02C 7/20* (2013.01); *F02K 3/06* (2013.01); *F05D 2240/50* (2013.01); *F05D 2260/96* (2013.01); *Y02T 50/671* (2013.01)

(58) Field of Classification Search
CPC ...... F01D 25/16; F01D 25/162; F01D 25/164; F02C 7/06; F02C 7/20; F02K 3/06; F05D 2260/96; Y02T 50/671
See application file for complete search history.

(56) References Cited

U.S. PATENT DOCUMENTS

| 2,655,307 A | 10/1953 | Buckland et al. |
| 3,287,906 A | 11/1966 | McCormick |

(Continued)

FOREIGN PATENT DOCUMENTS

| GB | 1516041 | 6/1978 |
| GB | 2041090 | 9/1980 |
| WO | 2007038674 | 4/2007 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

(Continued)

*Primary Examiner* — Steven Sutherland
(74) *Attorney, Agent, or Firm* — Carlson, Gaskey & Olds, P.C.

(57) ABSTRACT

An example gas turbine engine includes a turbine and first and second spools coaxial with one another. The first spool is arranged within the second spool and extends between forward and aft ends. The aft end extends axially beyond the second spool and supports the turbine. A housing is arranged downstream from the turbine. First and second bearings are mounted to the aft end of the first spool and supported by the housing portion.

19 Claims, 5 Drawing Sheets

Related U.S. Application Data continuation-in-part of application No. 13/567,178, filed on Aug. 6, 2012, now abandoned, which is a division of application No. 13/364,502, filed on Feb. 2, 2012, now abandoned.

(60) Provisional application No. 61/593,050, filed on Jan. 31, 2012.

(51) Int. Cl.
*F02C 7/20* (2006.01)
*F02K 3/06* (2006.01)
*F02C 3/10* (2006.01)

(56) References Cited

U.S. PATENT DOCUMENTS

| | | | |
|---|---|---|---|
| 3,365,032 | A | 1/1968 | Gomdt |
| 3,722,212 | A | 3/1973 | Stein |
| 3,823,553 | A | 7/1974 | Smith |
| 3,994,128 | A * | 11/1976 | Griswold, Jr. ......... F04D 29/323 60/226.1 |
| 4,304,522 | A * | 12/1981 | Newland ............... F01D 25/162 415/135 |
| 4,483,149 | A | 11/1984 | Rider et al. |
| 4,872,767 | A | 10/1989 | Knapp |
| 4,979,872 | A | 12/1990 | Myers et al. |
| 5,201,796 | A | 4/1993 | Glinski et al. |
| 5,369,952 | A | 12/1994 | Walters |
| 5,915,917 | A | 6/1999 | Eveker et al. |
| 6,151,909 | A | 11/2000 | Carter et al. |
| 6,331,078 | B1 | 12/2001 | Van Duyn |
| 6,826,914 | B2 | 12/2004 | Huster et al. |
| 6,846,158 | B2 | 1/2005 | Hull |
| 6,944,580 | B1 | 9/2005 | Blume et al. |
| 7,097,413 | B2 | 8/2006 | Van Duyn |
| 7,097,415 | B2 | 8/2006 | Bart et al. |
| 7,100,358 | B2 | 9/2006 | Gekht et al. |
| 7,290,386 | B2 | 11/2007 | Orlando et al. |
| 7,451,592 | B2 | 11/2008 | Taylor et al. |
| 7,594,404 | B2 | 9/2009 | Somanath et al. |
| 7,594,405 | B2 | 9/2009 | Somanath et al. |
| 7,610,763 | B2 | 11/2009 | Somanath et al. |
| 7,642,682 | B1 | 1/2010 | Matheny |
| 7,665,293 | B2 | 2/2010 | Wilson, Jr. et al. |
| 7,694,505 | B2 | 4/2010 | Schilling |
| 7,775,049 | B2 | 8/2010 | Kumar et al. |
| 7,793,488 | B2 | 9/2010 | Eleftheriou et al. |
| 7,802,962 | B2 | 9/2010 | Sjoqvist |
| 7,815,417 | B2 | 10/2010 | Somanath et al. |
| 7,950,236 | B2 | 5/2011 | Durocher et al. |
| 8,181,441 | B2 | 5/2012 | Smith |
| 8,209,950 | B2 | 7/2012 | Jain et al. |
| 2005/0152626 | A1 | 7/2005 | Gerez et al. |
| 2005/0254945 | A1 | 11/2005 | VanDuyn |
| 2006/0201160 | A1 | 9/2006 | Richards |
| 2007/0231134 | A1 | 10/2007 | Kumar et al. |
| 2009/0031732 | A1 | 2/2009 | Wilson, Jr. et al. |
| 2009/0229242 | A1 | 9/2009 | Schwark |
| 2010/0043390 | A1 | 2/2010 | Jain et al. |
| 2010/0064659 | A1 | 3/2010 | Wang |
| 2010/0148396 | A1 | 6/2010 | Xie et al. |
| 2010/0218483 | A1 | 9/2010 | Smith |
| 2010/0331139 | A1 | 12/2010 | McCune |
| 2011/0135463 | A1 | 6/2011 | Saville et al. |
| 2012/0017603 | A1 | 1/2012 | Bart et al. |
| 2012/0328431 | A1 | 12/2012 | Davis |
| 2013/0108440 | A1 | 5/2013 | Do et al. |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida. pp. 145-151.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

(56) References Cited

OTHER PUBLICATIONS

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

International Preliminary Report on Patentability for Application No. PCT/US2014/056880 dated Apr. 7, 2016.

Gunston, Bill, "Jane's Aero-Engines, " Issue Seven, 2000, pp. 510-512.

The Jet Engine, Third Edition, Rolls-Royce Limited, 1969, p. 39.

Jane's Aero-Engines, Issue Seven, Edited by Bill Gunston, Jane's Information Group Inc., Alexandria, Virginia, 2000, pp. 365, 506-511.

International Search Report and Written Opinion for PCT Application No. PCT/US2014/056880, dated Jan. 7, 2015.

Adhikari, Sondlpon, "Damping Models for Structural Vibration", Sep. 2000, pp. 25-35.

European Search Report for EP Application No. 13767684.7 dated Sep. 16, 2015.

International Preliminary Report on Patentability for PCT/US13/020750, dated Aug. 5, 2014.

International Search Report and Written Opinion for PCT/US13/20750 completed Aug. 21, 2013. Titled: Gas Turbine Engine AFT Bearing Arrangement.

Supplementary European Search Report for Application No. 14845485.3 dated Sep. 19, 2016.

* cited by examiner

GAS TURBINE ENGINE AFT BEARING ARRANGEMENT

This application is a continuation application of U.S. application Ser. No. 14/033,652, filed on Sep. 23, 2013, which is a continuation in part application of U.S. application Ser. No. 13/567,178, filed on Aug. 6, 2012, which is a divisional application of U.S. application Ser. No. 13/364,502, filed on Feb. 2, 2012, which claims priority to U.S. Provisional Application No. 61/593,050, filed on Jan. 31, 2012.

BACKGROUND

This disclosure relates to a bearing arrangement for a gas turbine engine.

A typical jet engine has two or three spools, or shafts, that transmit torque between the turbine and compressor sections of the engine. Each of these spools is typically supported by two bearings. One bearing, for example, a ball bearing, may be arranged at a forward end of the spool and be configured to react to both axial and radial loads. Another bearing, for example, a roller bearing or journal bearing may be arranged at the aft end of the spool and be configured to react only to radial loads. This bearing arrangement typically fully constrains the shaft except for rotation, and axial movement of one free end is permitted to accommodate engine axial growth.

SUMMARY

A bearing hub for a gas turbine engine according to an exemplary embodiment of this disclosure, among other possible things includes a radial to axial translation flange arm extending outward from an apex of the unitary structure, a translation flange extending outward from said translation flange arm, a spring arm connected to the apex for connecting the bearing hub to a canted annular flange.

In a further embodiment of the foregoing bearing hub, the translation flange arm extends axially aftward from the apex of the unitary structure.

In a further embodiment of the foregoing bearing hub, the spring arm comprises at least a first flex point, a second flex point, and a third flex point, and a stiffness of each of the flex points is configured to determine an amount of radial vibrations translated to axial vibrations by the bearing hub.

In a further embodiment of the foregoing bearing hub, the first and second hub walls are inclined radially inward from an annular apex, and a first and second bearing are respectively supported by the first and second walls opposite the apex.

In a further embodiment of the foregoing bearing hub, a focal node of radial vibrations of the bearing hub is the first bearing.

In a further embodiment of the foregoing bearing hub, the spring arm is rigidly connected to the apex.

A gas turbine engine according to an exemplary embodiment of this disclosure, among other possible things includes a fan, a compressor section fluidly connected to the fan, the compressor including a first compressor section and a second compressor section, a combustor fluidly connected to the compressor section, a turbine section fluidly connected to the combustor, the turbine section including a first turbine section coupled to the first compressor section via a shaft, a second turbine section, first and second hub walls integrally formed with one another to provide a unitary structure, a radial to axial translation flange arm extending outward from an annular apex of the unitary structure, a translation flange extending outward from the translation flange arm, turbine exhaust case arranged downstream from the second turbine section and supporting the annular apex, and a spring arm connecting the apex to a canted annular flange of the turbine exhaust case.

In a further embodiment of the foregoing gas turbine engine, the translation flange arm extends axially aftward from the apex of the unitary structure.

In a further embodiment of the foregoing gas turbine engine, the translation flange is received in an annular cavity supported by the canted annular flange.

In a further embodiment of the foregoing gas turbine engine, the annular cavity includes an axial vibration damper.

In a further embodiment of the foregoing gas turbine engine, the axial vibration damper includes at least a first wire mesh structure disposed between the translation flange and a first wall of the annular cavity.

In a further embodiment of the foregoing gas turbine engine, the axial vibration damper includes at least a second wire mesh structure disposed between the translation flange and a second wall of the annular cavity.

In a further embodiment of the foregoing gas turbine engine, the axial vibration damper includes at least a first seal defining a damping annulus within the annular cavity.

A further embodiment of the foregoing gas turbine engine includes a damping fluid disposed within the damping annulus.

In a further embodiment of the foregoing gas turbine engine, the damping fluid is damping oil.

In a further embodiment of the foregoing gas turbine engine, the axial vibration damper includes at least a second seal further defining the damping annulus.

In a further embodiment of the foregoing gas turbine engine, the seal is one of an elastomeric O-ring seal and a piston ring.

In a further embodiment of the foregoing gas turbine engine, the second turbine section is a low pressure turbine, and the low pressure turbine is configured to have a pressure ratio that is greater than about 5:1.

A method for damping vibrations in a bearing hub according to an exemplary embodiment of this disclosure, among other possible things includes converting radial vibrations in the bearing hub to axial vibrations using a spring arm and a radial to axial vibration translation flange, damping axial vibrations of the radial to axial vibration translation flange using an axial vibration damper.

A further embodiment of the foregoing method, includes the step of adjusting a level of vibrational damping by adjusting a stiffness of the spring arm.

The foregoing features and elements may be combined in any combination without exclusivity, unless expressly indicated otherwise.

BRIEF DESCRIPTION OF THE DRAWINGS

The disclosure can be further understood by reference to the following detailed description when considered in connection with the accompanying drawings.

DETAILED DESCRIPTION

Figure 1:
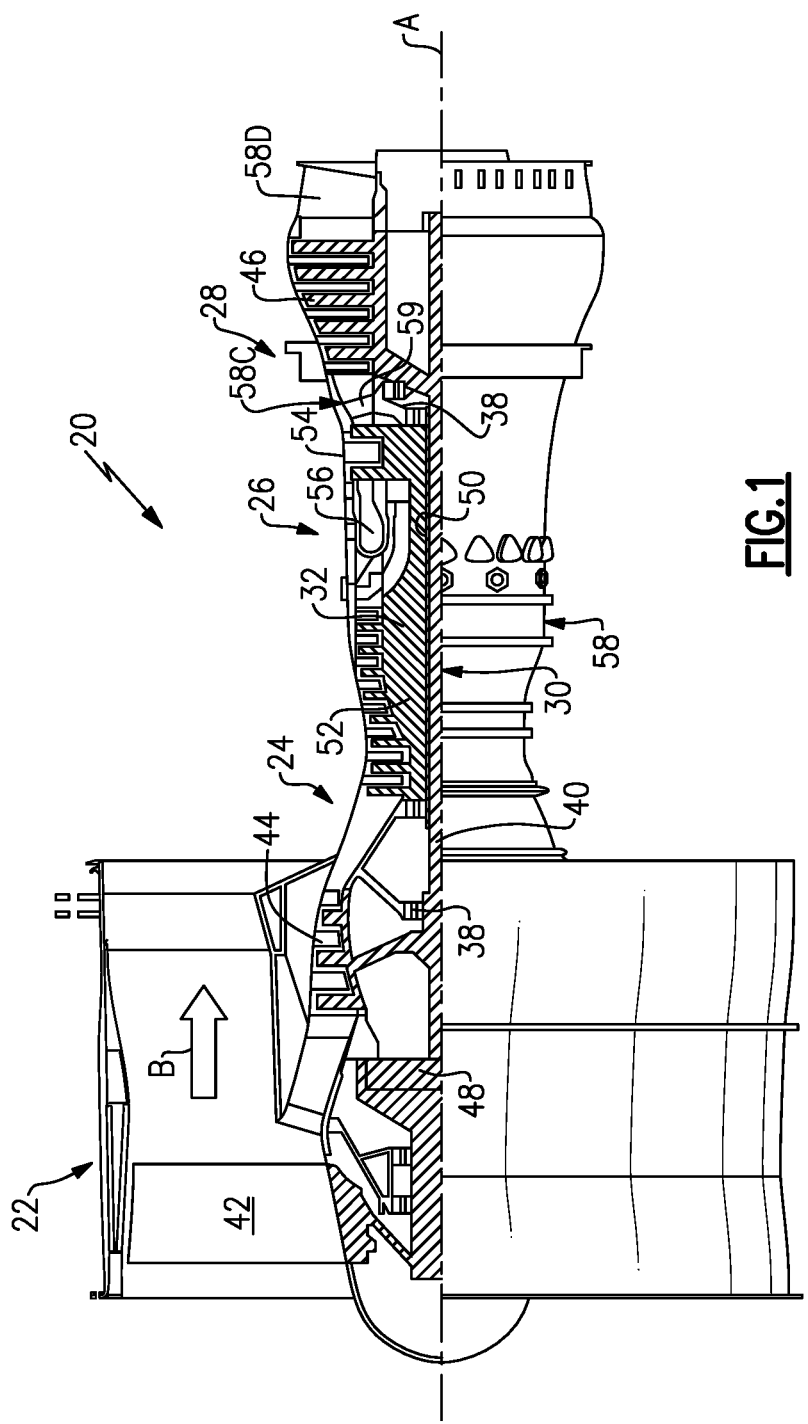
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure or housing 58 via several bearing systems 38. It should be understood that various bearing systems 38 at various locations may alternatively or additionally be provided. The housing 58 includes first, second, third, and fourth housing portions 58A, 58B, 58C, 58D. The third and fourth housing portions 58C, 58D respectively correspond to a mid-turbine frame and a turbine exhaust case.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The mid-turbine frame 58C of the engine static structure 36 is arranged generally between the high pressure turbine 54 and the low pressure turbine 46. The mid-turbine frame 58C supports one or more bearing systems 38 in the turbine section 28. The turbine exhaust case 58D is arranged downstream from the low pressure turbine 46 and may support one or more bearing systems as well. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 is, in one example, a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Temperature ambient deg Rankine)/518.7)^0.5]. The "Low corrected fan tip speed" as disclosed herein according to one non-limiting embodiment is less than about 1150 ft/second.

Figure 2:
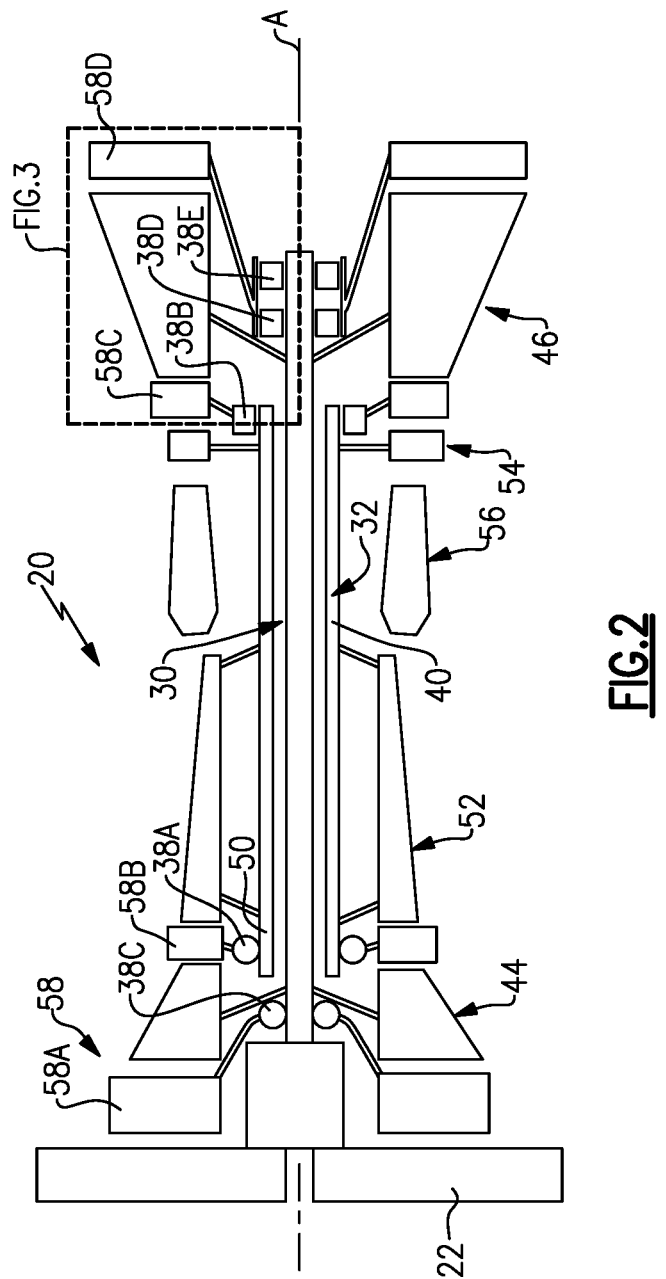
FIG. 2 is another schematic view of the gas turbine engine illustrating an example bearing arrangement.

An example bearing arrangement for the gas turbine engine 20 is schematically depicted in FIG. 2. The low speed spool 30 extends axially between forward and aft ends, with the aft end extending beyond the high speed spool 32. The high speed spool 32 is supported for rotation by first and second bearings 38A, 38B. In one example, the first bearing 38A is of a type that may react to both axial and radial loads, such as a ball bearing. The second bearing 38B is of a type that reacts to radial loads, such as a roller bearing or a journal bearing. The low speed spool 30 is supported by first, second and third bearings 38C, 38D, 38E. The first bearing 38C is of a type that reacts to both axial and radial loads. The second and third bearings 38D, 38E are of a type that reacts to radial loads. The second and third bearings 38D, 38E support an aft end of the low speed spool 30.

The low speed spool 30 has a higher length/diameter (L/D) ratio than the high speed spool 32. From a rotor dynamics standpoint, a shaft will reach a critical speed of instability at a lower speed as the L/D ratio gets larger. Providing at least two bearings at the aft end of the low speed spool 30 increases the critical speed of the low speed spool 30, which enables higher overall engine speeds and lower weight thereby allowing the engine 20 to be faster and smaller for a given level of thrust.

Figure 3:
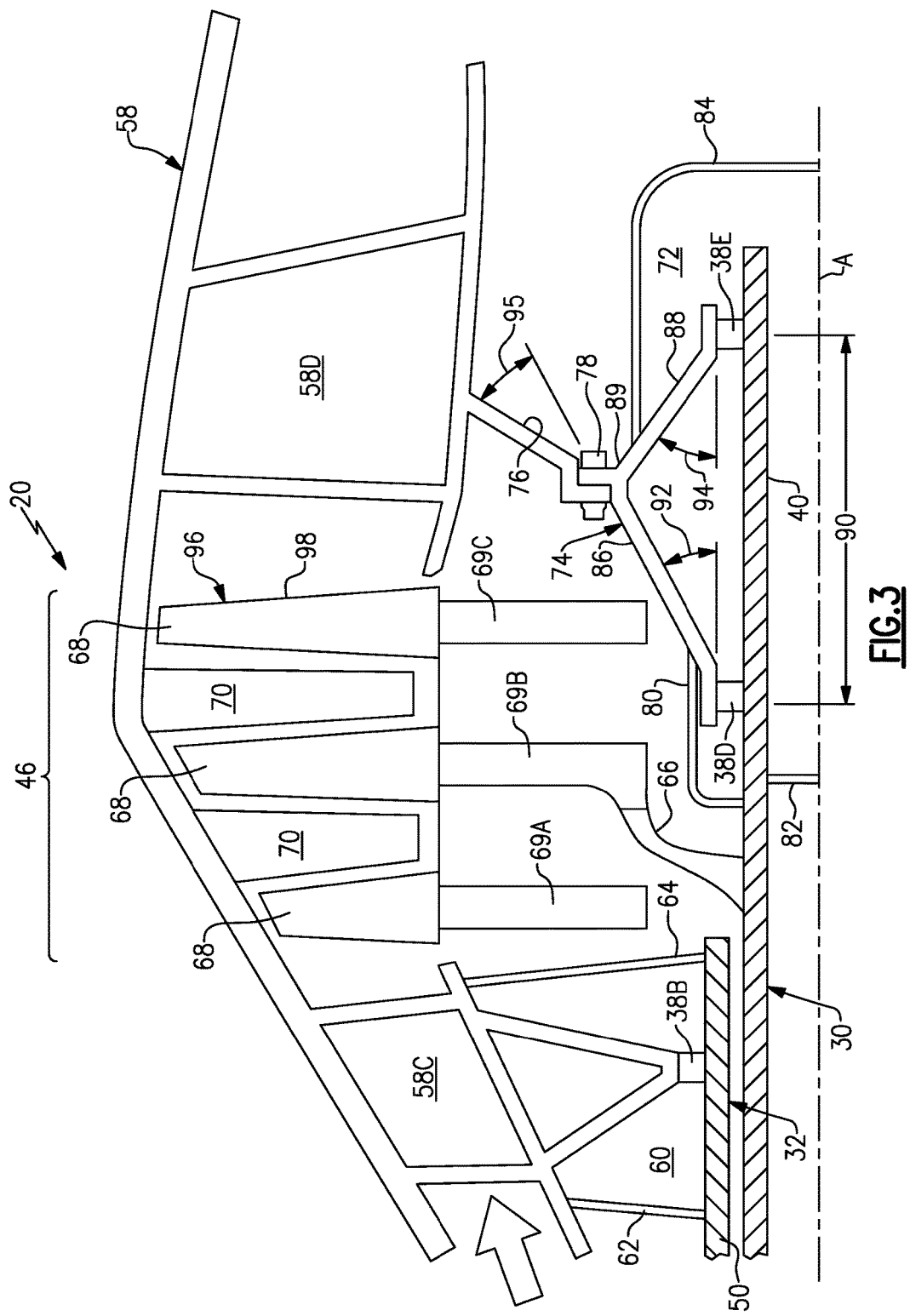
FIG. 3 is a more detailed schematic view of an aft bearing arrangement illustrated in FIG. 2.

FIG. 3 illustrates a more detailed view of the engine 20 shown in FIG. 2. The second bearing 38B supporting the low speed spool 30 is arranged within a first bearing compartment 60. The first bearing compartment 60 is provided by first and second walls 62, 64, which are sealed relative to the third housing portion 16C and the second spool 30.

The low pressure turbine 46 includes a low pressure turbine rotor hub 66 secured to the low speed spool 30. The low pressure turbine rotor hub 66 supports multiple low pressure turbine blades 68 in one example. Low pressure turbine stator vanes 70 are provided between the low pressure turbine blades 68 and supported by the housing 16. The low pressure turbine rotor hub 66 is canted in an aft direction, which accommodates a second bearing compartment 72. The second and third bearings 38D, 38E are arranged within the second bearing compartment 72, which is provided by first and second walls 80, 82 and a cover 84, for example. The cover 74 is removably secured over the aft end and encloses the second and third bearings 38D, 38E.

In the example, the turbine exhaust case 58D includes a radially rearward canted annular flange 76, which removably supports a hub 74 secured to the flange 76 by fasteners 78. The hub 74 includes first and second hub walls 86, 88 canted toward one another in opposite directions and adjoining one another at an annular apex 89 provided near the flange 76 in the example shown. In the example shown, the first and second hub walls 86, 88 provide an integrated, unitary structure. Each of the first and second hub walls 86, 88 supports one of the second and third bearings 38D, 38E. The aft-canted low pressure turbine rotor hub 66 accommodates at least the second bearing 38D and a portion of the first hub wall 86 is arranged radially beneath the low pressure turbine 46 such that axial length need not be added to the low speed spool 30. The second bearing 38D is arranged axially forward of an aft side 98 of a last rotor stage 96.

In one example, the second and third bearings 38D, 38E are spaced apart from one another a span 90 that is approximately 4-12 inches (10-30 cm), for example. In one example, the first hub wall is oriented at a first angle 92 of between about 30° and about 60°, and the second hub wall 88 is oriented at a second angle 94 of between about 30° and about 60°. The annular flange 76 is oriented relative to the first hub wall 86 at a third angle 95 of between about 0° and about 30°, for example. In one example, the first angle 90 is about 45° and the third angle 95 is about 0°. The above values are exemplary for one example engine design.

The multiple turbine rotors include first, second and third turbine rotors 69A, 69B, 69C. The third turbine rotor is part of the last rotor stage 96. The first turbine rotor 69A corresponds to a forward-most rotor stage. The second turbine rotor 69B is arranged axially between the first and third rotors 69A, 69C. The low pressure turbine rotor hub 66 is mounted on the low speed spool 30 and is secured to the second turbine hub 69B for supporting the low pressure turbine 46. In one example, the bearing hub 74 includes a moment stiffness of about 80,000,000 in-lb/rad (9,144,000 cm-kg/rad), for example, and a lateral stiffness of about 5,000,000 lb/in (886,000 kg/cm).

Figure 4:
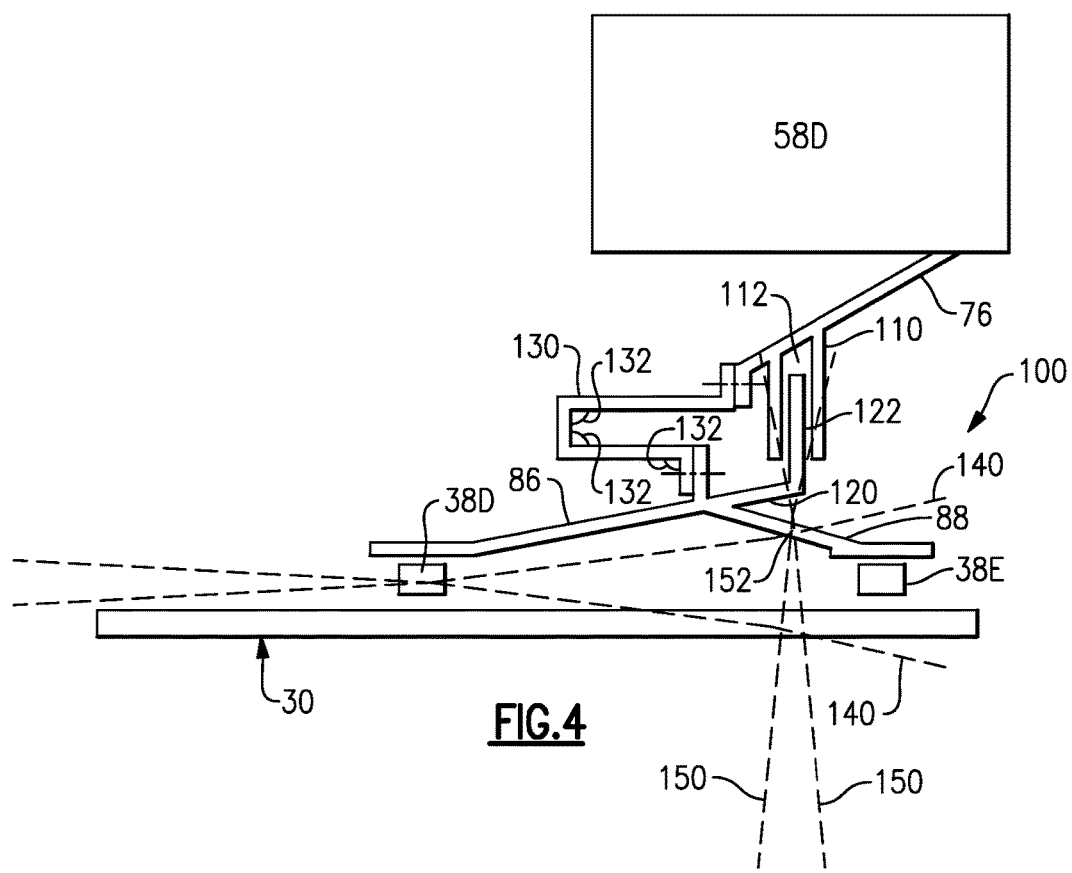
FIG. 4 schematically illustrates a more detailed alternative example of the aft bearing arrangement illustrated in FIG. 2.

With continued reference to FIGS. 1-3, and with like numerals indicating like elements, FIG. 4 schematically illustrates a more detailed alternative example of the aft bearing arrangement illustrated in FIG. 2. The alternate aft bearing arrangement 100 of FIG. 4 includes an annular cavity 112 defined by annulus walls 110. The annulus walls 110 are supported by the radially rearward canted annular flange 76.

A radial to axial translation flange arm 120 extends from the apex defined by the first and second hub walls 86, 88 and supports a radial to axial translation flange 122. Also connecting the apex of the first and second hub walls 86, 88 to the radially rearward canted annular flange 76 is a spring arm 130. The spring arm 130 has multiple flex points 132 that cooperate to convert radial vibrations 140 in the aft bearing arrangement 100 into axial vibrations 150 in the radial to axial translation flange 122.

During operation of the turbine engine, the aft bearing arrangement 100 vibrates about the second bearing 38D connecting the aft bearing arrangement 100 to the low speed spool 30. Due to the design of the aft bearing arrangement 100, the second bearing 38D is the focal node of the aft bearing radial vibrations 140 (illustrated by dashed lines). The illustrated radial vibrations 140 are exaggerated for illustrative effect.

The spring arm 130 operates cooperatively with the radially rearward canted annular flange 76 to convert the radial vibrations 140 into axial vibrations 150 (illustrated by dashed lines) by flexing at the flex points 132 and along the longitudinal cylinders comprising the spring arm 130. The axial vibrations 150 have a focal node 152 centered in the second hub wall 88. In alternate examples, the focal node of the axial vibrations 150 can be located anywhere radially aligned with the illustrated focal node 152, as dictated by the design of the spring arm 130.

The magnitude of the axial vibrations 150 and the amount of translation from the radial vibrations 140 to the axial vibrations 150 is directly related to the stiffness of the spring arm 130. One of skill in the art, having the benefit of this disclosure, can adjust the amount of radial vibrations 140 translated into axial vibrations 150 by adjusting the stiffness of the spring arm 130. In a practical embodiment, the spring arm 130 stiffness is adjusted during engine design and a spring arm 130 having a fixed spring stiffness of the determined stiffness is utilized in the actual assembly.

Figure 5:
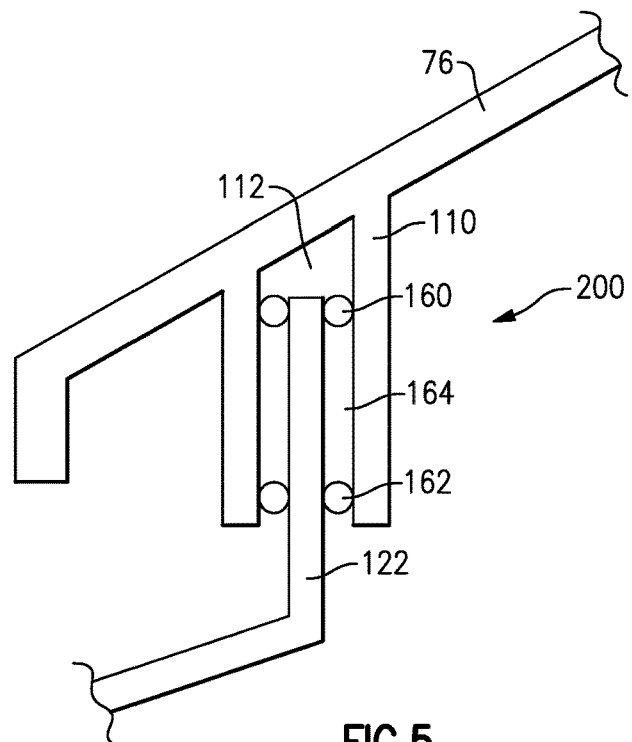
FIG. 5 schematically illustrates a first damping annulus for the alternative example aft bearing arrangement of FIG. 4.

Once the radial vibrations 140 are translated into axial vibrations 150, the vibrations 150 are damped via an axial vibration damper positioned within the annular cavity 112. With continued reference to FIGS. 1-4, and with like numerals indicating like elements, FIG. 5 illustrates a first example axial vibration damping arrangement 200 positioned within the annular cavity 112. The radial to axial translation flange 122 is received in the annular cavity 112 and a pair of seals 160, 162 creates a damping annulus 164 within the annular cavity 112. In one example, the seals 160, 162 are elastomeric O-ring seals. In an alternate example, the seals 160, 162 are a non-elastomeric seal, such as a piston ring. A fluid, such as oil, is received within the damping annulus 164 and dampens the axial vibrations 150 by axially compressing and decompressing as the radial to axial translation flange 122 vibrates.

Figure 6:
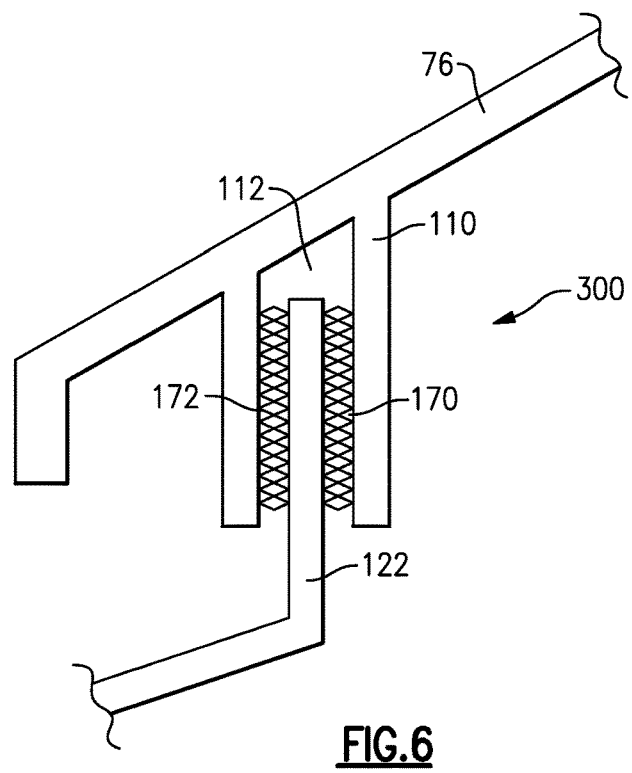
FIG. 6 schematically illustrates a second damping annulus for the alternative example aft bearing arrangement of FIG. 4.

With continued reference to FIGS. 1-4, and with like numerals indicating like elements, FIG. 6 illustrates an alternate axial damping arrangement 300 for the aft bearing arrangement illustrated in FIG. 2. As with the axial damping arrangement 200 of FIG. 5, the radial to axial translation flange 122 is received in the annular cavity 112 defined by the annulus walls 110. Instead of a fluid filled damping annulus 164 defined by a pair of seals, the radial to axial flange 122 is received between a pair of metal mesh dampers 170, 172. As the radial to axial flange 122 vibrates axially, the metal mesh dampers 170, 172 compress and decompress, thereby damping the vibration of the aft bearing arrangement, and reducing the negative impact of vibrations. The amount of damping provided by the metal mesh dampers 170, 172 can also be adjusted by adjusting the stiffness of the metal mesh dampers 170, 172.

With continued reference to FIGS. 1-6, utilization of the aft bearing arrangement 100 allows the trunnion bearings to be spaced closer than conventional trunnion bearings, as the axial vibration damping has a greater damping effect. Similarly, while the above examples are described with regards to an aft bearing arrangement, the disclosed structure can be adapted to other radial damping bearing arrangements by one skilled in the art having the benefit of this disclosure in order to replace the radial damping with axial damping, or, alternatively, to augment existing radial damping.

Although example embodiments have been disclosed, a worker of ordinary skill in this art would recognize that certain modifications would come within the scope of the claims. For that reason, the following claims should be studied to determine their true scope and content.

What is claimed is:

1. A bearing hub for a gas turbine engine comprising:
   first and second hub walls integrally formed with one another to provide a unitary structure;
   a radial to axial translation flange arm extending outward from an apex of the unitary structure;
   a translation flange extending outward from said radial to axial translation flange arm;
   a spring arm connected to the apex for connecting the bearing hub to a canted annular flange, the spring arm including a plurality of angled flex points.

2. The bearing hub of claim 1, wherein the radial to axial translation flange arm extends axially aftward from said apex of said unitary structure.

3. The bearing hub of claim 1, wherein the plurality of angled flex points comprises at least a first flex point, a second flex point, and a third flex point, and wherein a stiffness of each of said first flex point, said second flex point and said third flex point is configured to control an amount of radial vibrations translated to axial vibrations by said bearing hub.

4. The bearing hub of claim 1, wherein the first and second hub walls are inclined radially inward from an annular apex, and a first and second bearing are respectively supported by the first and second walls opposite the apex.

5. The bearing hub of claim 4, wherein a focal node of radial vibrations of the bearing hub is the first bearing.

6. The bearing hub of claim 1, wherein said spring arm is rigidly connected to said apex.

7. A gas turbine engine comprising:
   a fan;
   a compressor section fluidly connected to the fan, the compressor section comprising a first compressor section and a second compressor section;
   a combustor fluidly connected to the compressor section;
   a turbine section fluidly connected to the combustor, the turbine section comprising:
      a first turbine section coupled to the first compressor section via a shaft;
      a second turbine section;
      first and second hub walls integrally formed with one another to provide a unitary structure;
      a radial to axial translation flange arm extending outward from an annular apex of the unitary structure;
      a translation flange extending outward from said radial to axial translation flange arm;
      turbine exhaust case arranged downstream from the second turbine section and supporting the annular apex; and
      a spring arm connecting the annular apex to a canted annular flange of the turbine exhaust case, the spring arm including a plurality of angled flex points.

8. The gas turbine engine of claim 7, wherein the radial to axial translation flange arm extends axially aftward from said annular apex of said unitary structure.

9. The gas turbine engine of claim 7, wherein said translation flange is received in an annular cavity supported by the canted annular flange.

10. The gas turbine engine of claim 9, wherein said annular cavity includes an axial vibration damper.

11. The gas turbine engine of claim 10, wherein said axial vibration damper comprises at least a first wire mesh structure disposed between said translation flange and a first wall of said annular cavity.

12. The gas turbine engine of claim 11, wherein said axial vibration damper comprises at least a second wire mesh structure disposed between said translation flange and a second wall of said annular cavity.

13. The gas turbine engine of claim 10, wherein said axial vibration damper comprises at least a first seal defining a damping annulus within said annular cavity.

14. The gas turbine engine of claim 13, further comprising a damping fluid disposed within said damping annulus.

15. The turbine engine of claim 14, wherein said damping fluid is damping oil.

16. The turbine engine of claim 13, wherein said axial vibration damper comprises at least a second seal further defining the damping annulus.

17. The turbine engine of claim 13, wherein said first seal is one of an elastomeric O-ring seal and a piston ring.

18. A method for damping vibrations in a bearing hub comprising the steps of:
   converting radial vibrations in said bearing hub to axial vibrations using a spring arm and a radial to axial vibration translation flange, wherein the spring arm includes a plurality of angled flex points;
   damping axial vibrations of said radial to axial vibration translation flange using an axial vibration damper.

19. The method of claim 18, further comprising the step of adjusting a level of vibrational damping by adjusting a stiffness of the spring arm.

* * * * *